(12) United States Patent
Vladan

(10) Patent No.: US 9,654,009 B2
(45) Date of Patent: May 16, 2017

(54) HIGH EFFICIENCY DC-TO-DC CONVERTER

(71) Applicant: Avago Technologies General IP (Singapore) Pte. Ltd., Singapore (SG)

(72) Inventor: Marius Ionel Vladan, Oudenaarde (BE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 102 days.

(21) Appl. No.: 14/575,682

(22) Filed: Dec. 18, 2014

(65) Prior Publication Data

US 2016/0164410 A1 Jun. 9, 2016

Related U.S. Application Data

(60) Provisional application No. 62/088,106, filed on Dec. 5, 2014.

(51) Int. Cl.
| | |
|---|---|
| *H02M 3/156* | (2006.01) |
| *H02M 3/157* | (2006.01) |
| *H02M 3/158* | (2006.01) |
| *H02M 1/00* | (2006.01) |

(52) U.S. Cl.
CPC .. *H02M 3/1588* (2013.01); *H02M 2001/0058* (2013.01); *Y02B 70/1466* (2013.01); *Y02B 70/1491* (2013.01)

(58) Field of Classification Search
CPC ...... H02M 3/155; H02M 3/156; H02M 3/157; H02M 3/158; H02M 3/1562; H02M 2001/0067; G05F 1/56; G05F 1/575

USPC ................. 323/271, 282–285, 351
See application file for complete search history.

(56) References Cited

U.S. PATENT DOCUMENTS

| | | | | |
|---|---|---|---|---|
| 5,451,912 A * | 9/1995 | Torode | ..... | H03L 7/183 331/108 C |
| 5,912,552 A * | 6/1999 | Tateishi | ..... | H02M 3/1588 323/224 |
| 7,282,878 B1 * | 10/2007 | Rakov | ..... | H02P 25/03 318/400.01 |
| 2009/0015215 A1 * | 1/2009 | Ajram | ..... | H02M 3/156 323/234 |
| 2011/0175584 A1 * | 7/2011 | Huber | ..... | H02M 3/158 323/282 |

(Continued)

*Primary Examiner* — Adolf Berhane
(74) *Attorney, Agent, or Firm* — Sterne, Kessler, Goldstein & Fox P.L.L.C.

(57) ABSTRACT

A power converter is described herein. The power converter may be configured to enable a high-side switch when a resonating voltage at a switching net coupled between the high-side switch and a low-side switch reaches a maximum voltage while the power converter operates in a discontinuous current mode. The power converter may sample the resonating voltage at the switching net at a time when the high-side switch is enabled and compare the sampled voltage with a previously-sampled voltage of the switching net. A frequency of an oscillating signal that drives the activation of the high-side switch is periodically adjusted based on the comparison, which causes the high-side switch to be enabled at different times with respect to the resonating voltage. The frequency of the oscillating signal is continuously adjusted such that the high-side switch is enabled at time(s) where the resonating voltage reaches (or is near) its maximum voltage.

22 Claims, 5 Drawing Sheets

(56) References Cited

U.S. PATENT DOCUMENTS

2012/0212204 A1\* 8/2012 Philbrick .............. H02M 3/156
　　　　　　　　　　　　　　　　　　　　　　323/284
2013/0049711 A1\* 2/2013 Mirea ................. H02M 3/1563
　　　　　　　　　　　　　　　　　　　　　　323/234

\* cited by examiner

HIGH EFFICIENCY DC-TO-DC CONVERTER

CROSS REFERENCE TO RELATED APPLICATION

This application claims priority to U.S. Provisional Application Ser. No. 62/088,106, filed Dec. 5, 2014, the entirety of which is incorporated by reference herein.

BACKGROUND

Technical Field

Embodiments described herein generally relate to systems and methods for converting a source of direct current (DC) from one voltage level to another.

Description of Related Art

DC-to-DC converters are typically used to convert from one DC voltage level to another DC voltage level. There are increasing demands for DC-to-DC converters to operate with ever increasing efficiency due to the proliferation of portable electronic devices. In most instances, these portable electronic devices are intended to be primarily driven by battery power, and longer lasting batteries are preferred. To extend battery life, the operational voltages for various electronic devices (such as microprocessors and memory) are being driven to lower and lower levels.

BRIEF SUMMARY

Methods, systems, and apparatuses are described for providing a high efficiency DC-to-DC converter, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
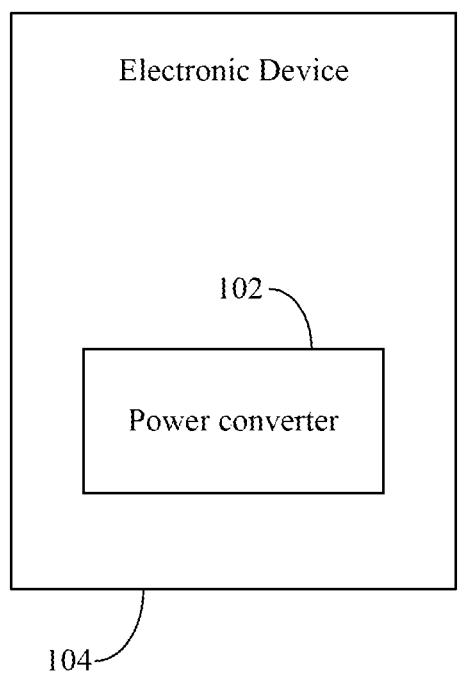
FIG. 1 depicts a block diagram of an example electronic device containing a power converter, according to an example embodiment.

The features and advantages of the subject matter of the present application will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner.

These example embodiments, as well as additional embodiments, are described in further detail in the following section/subsections.

II. Example Embodiments

In embodiments, a power converter is described herein. In accordance with an embodiment, the power converter is configured to enable a high-side switch when a resonating voltage at a switching net coupled between the high-side switch and a low-side switch reaches a maximum voltage while the power converter operates in a discontinuous current mode. The power converter may sample the resonating voltage at the switching net at a time when the high-side switch is enabled and compare the sampled voltage with a previously-sampled voltage of the switching net. A frequency of an oscillating signal that drives the activation of the high-side switch is periodically adjusted based on the comparison, which causes the high-side switch to be enabled at different times with respect to the resonating voltage. The frequency of the oscillating signal is continuously adjusted such that the high-side switch is enabled at time(s) where the resonating voltage reaches (or is near) its maximum voltage. By doing so, output capacitance switching losses, voltage spikes, and/or current spikes that occur in the power converter are minimized.

For example, a method is described herein. In accordance with the method, a voltage at a node between a first switch and a second switch of a power converter is determined. A frequency of an oscillating signal is adjusted based at least on the determined voltage. A control signal is generated based on the frequency-adjusted oscillating signal that causes the first switch to be enabled.

An apparatus is also described herein. The apparatus includes a high-side switch, a low-side switch, a node coupled to the high-side switch and the low-side switch, voltage sampling logic, and adjustment logic. The voltage sampling logic is coupled to the node and is configured to sample a voltage at the node. The adjustment logic is configured to provide a first control signal that adjusts a frequency of an oscillating signal based at least on the sampled voltage. The frequency-adjusted oscillating signal is used to generate a second control signal that causes the high-side switch to be enabled.

Another apparatus is further described herein. The apparatus includes a high-side transistor comprising a first gate terminal, a first source terminal, and a first drain terminal, a low-side transistor comprising a second gate terminal, a second source terminal, and a second drain terminal, a node coupled to the first drain terminal and the second drain terminal, voltage sampling logic, and adjustment logic. The voltage sampling logic is coupled to the node and is configured to sample a voltage at the node. The adjustment logic is configured to provide a first control signal that causes a frequency at which a second control signal is provided to the first gate terminal to be adjusted based at least on the sampled voltage. The second control signal causes the high-side transistor to be enabled when the second control reaches a threshold voltage.

These and further embodiments are described in detail in the following section.

III. High Efficiency Power Converter

FIG. 1 depicts a block diagram of an example electronic device 104 that includes a power converter 102 in accordance with an embodiment. Power converter 102 may be any device or combination of devices/components configured to convert power from one voltage level to another voltage level. In accordance with an embodiment, power converter 102 is a direct current (DC)-to-DC power converter (e.g., a buck converter), which is configured to convert a first (e.g., relatively higher) DC input voltage to a second (e.g., relatively lower) DC output voltage. The DC input voltage may be provided directly from a DC power source or may be obtained by converting an alternating current (AC) input voltage provided by an AC power source to the DC input voltage. Power converter 102 may be included in electronic device 104. Examples of electronic device 104 include, but are not limited to, a power charging device, a mobile phone, a personal data assistant (PDA), a tablet computer, a laptop computer, a handheld computer, a desktop computer, a video game system, or any device that requires power management for one or more components included therein.

Power converter 102 may be configured to operate in one of a plurality of modes. For example, power converter 102 may operate in a continuous current mode or a discontinuous current mode. In the continuous current mode, the current through an output inductor included in power converter 102 may fluctuate between positive value(s) and/or negative value(s). In the discontinuous current mode, the current through the output inductor fluctuates between zero and positive value(s) and high-side and low-side switches (that are configured to controllably provide DC power to a load of power converter 102) are both disabled when the current reaches zero. When the high-side and low-side switches are both disabled, the output stage of power converter 102 is tri-stated, which causes the output inductor to resonate with the output capacitance of the output stage. The high-side switch may be enabled any time while the output stage and output inductor resonate. Power converter 102 may suffer from significant output capacitance switching loss, voltage spikes (dv/dt), and/or current spikes (di/dt) depending on when the high-side switch is enabled while the output stage and output inductor resonate. The lower the voltage level of the resonating output stage when the high-side switch is enabled, the greater the output capacitance switching loss, voltage spikes, and/or current spikes. Accordingly, power converter 102 may be configured to minimize the output capacitance switching loss, voltage spikes, and/or current spikes by determining an optimal time/instance to activate the high-side switch. In particular, power converter 102 may be configured to enable the high-side switch when the resonating output stage reaches (or is near) a maximum voltage.

Figure 2:
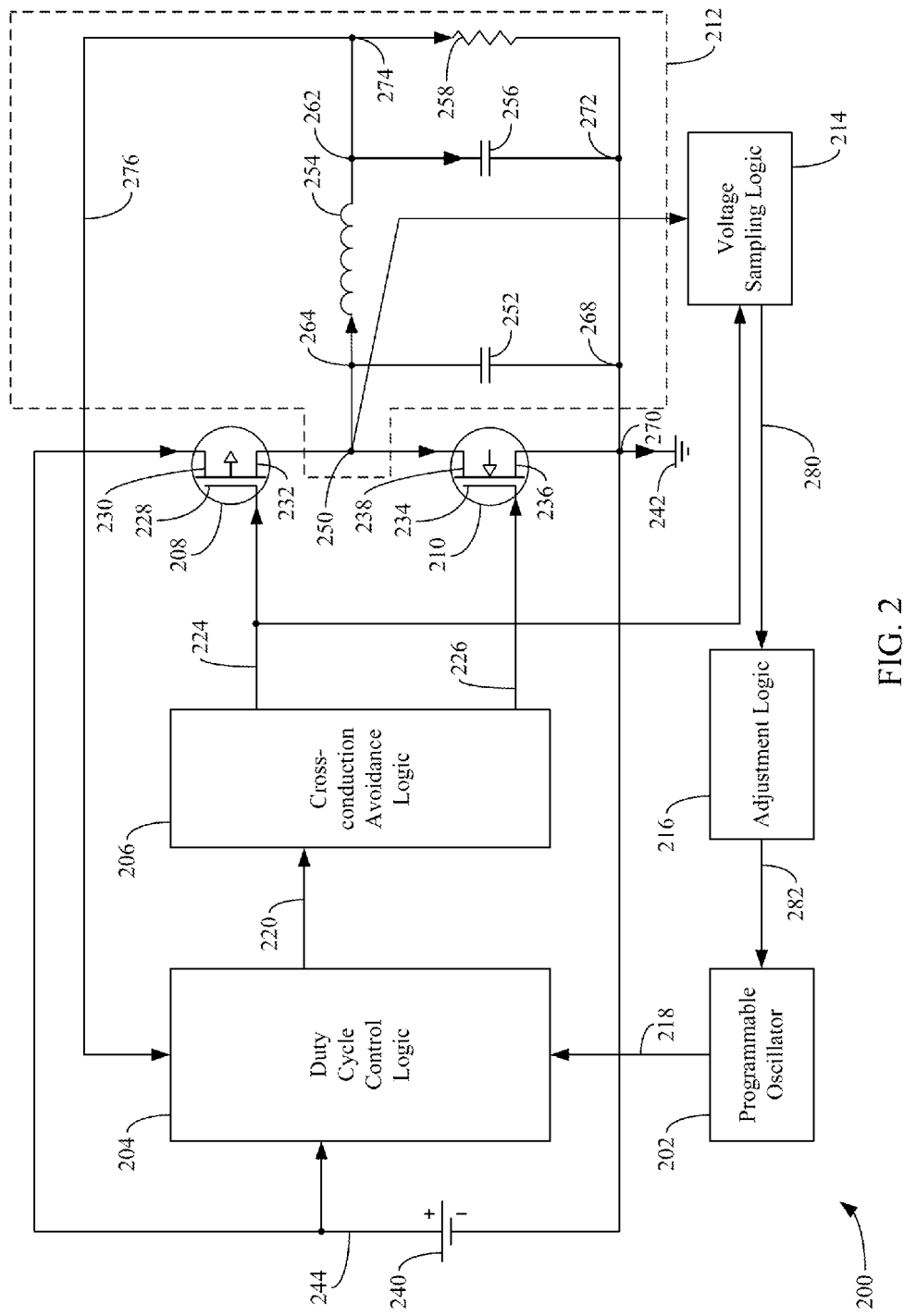
FIG. 2 depicts a block diagram of an example power converter, according to another example embodiment.

Power converter 102 may be configured in various ways, in embodiments. For instance, FIG. 2 depicts a block diagram of an example power converter 200 in accordance with an embodiment. Power converter 200 is an example of power converter 102 shown in FIG. 1. Power converter 200 is configured to convert a DC input voltage, referred to as input voltage 244 in FIG. 2, to a lower DC output voltage, referred to as output voltage 276 in FIG. 2. The DC input voltage may be provided directly from a DC power source 240 or may be obtained by converting an AC input voltage provided by an AC power source to the DC input voltage. As shown in FIG. 2, power converter 200 includes a programmable oscillator 202, duty cycle control logic 204, cross-conduction avoidance logic 206, a first (high-side) switch 208, a second (low-side) switch 210, an output stage 212, voltage sampling logic 214, and adjustment logic 216.

Programmable oscillator 202 is coupled to duty cycle control logic 204. Duty cycle control logic 204 is coupled to cross-conduction avoidance logic 206 and DC input source 240. High-side switch 208 includes a gate terminal 228, a source terminal 230, and a drain terminal 232, and low-side switch 210 includes a gate terminal 234, a source terminal 236, and a drain terminal 238. Source terminal 230 of high-side switch 208 is coupled to DC power source 240, which provides an input voltage 244. Drain terminal 232 of high-side switch 208 is coupled to drain terminal 238 of low-side switch 210. Source terminal 236 of low-side switch 210 is coupled to a ground source 242 (via a node 270). Cross-conduction avoidance logic 206 is coupled to gate terminal 228 of high-side switch 208 and gate terminal 234 of low-side switch 210. Output stage 212 is coupled to node 250 (also referred to as a "switching net").

In the example of FIG. 2, output stage 212 includes an output capacitor 252 (which may be representative of parasitic capacitance), an output inductor 254, a load capacitor 256, and a load (represented by a resistor 258). Output inductor 254 is coupled between a node 264 and a node 262. Node 264 is coupled to node 250 (e.g., forming a single node). Output capacitor 252 is coupled between node 264 and a node 268. Node 268 is coupled to ground source 242 (via node 270). Load capacitor 256 is coupled between node 262 and a node 272. Node 272 is coupled to node 268 (e.g., forming a single node). Resistor (or load) 258 is coupled between a node 274 and node 272. Node 274 is coupled to node 262 (e.g., forming a single node) and duty cycle control logic 204.

Voltage sampling logic 214 is coupled to node 250, to cross-conduction avoidance logic 206, and to adjustment logic 216. Adjustment logic 216 is coupled to programmable oscillator 202.

Each of the components of power converter 200 (e.g., programmable oscillator 202, duty cycle control logic 204, cross-conduction avoidance logic 206, voltage sampling logic 214, adjustment logic 216, high-side switch 208, low-side switch 210, output capacitor 252, output inductor 254, load capacitor 256, and/or load 258) may be electrically and/or mechanically coupled to another component of power converter 200 (e.g., as shown in FIG. 2) via one or more electrically conductive wires, one or more electrically conductive traces, one or more intermediary electrical components (e.g., resistors, capacitors, amplifiers, transistors, etc.), and/or any other electrical conductors.

Programmable oscillator 202 is configured to generate an oscillating signal (e.g., a clock signal) 218. Oscillating signal 218 is provided to duty cycle control logic 204. As will be described below, the frequency of oscillating signal 218 is programmable based on a control signal 282 generated by adjustment logic 216.

Duty cycle control logic 204 is configured to generate a modulated width pulse 220 based on oscillating signal 218. Modulated width pulse 220 may have a duty cycle equal to an output voltage 276 divided by input voltage 244. In accordance with an embodiment, modulated width pulse 220 is generated by comparing output voltage 276 (or a divided version thereof) to a sawtooth ramp signal that is generated based on oscillating signal 218. The difference in voltage between output voltage 276 and the sawtooth ramp signal corresponds to modulated width pulse 220 (e.g., when the sawtooth ramp signal has a greater voltage value than output voltage 276, modulated width pulse 220 is low; when the sawtooth ramp signal has a smaller voltage value than output voltage 276, modulated width pulse 220 is high). The frequency at which modulated pulse width 220 is generated may be varied by adjusting the frequency of oscillating signal 218. It is noted that modulated pulse width 220 may be generated in accordance to other techniques known in the art. Modulated width pulse 220 is received by cross-conduction avoidance logic.

Cross-conduction avoidance logic 206 is configured to generate a high-side switch control signal 224 used to enable/disable high-side switch 208 and a low-side switch control signal 226 used to enable/disable low-side switch 210 based on modulated width pulse 220. Cross-conduction avoidance logic 206 is configured to prevent the flow of a cross-conduction (or shoot-through) current from power source 240 to ground source 242 by ensuring that high-side switch 208 and low-side switch 210 are not enabled at the same time (e.g., by asserting (or de-asserting, in embodiments in which high-side switch 208 and/or low-side switch 210 are active "low") high-side switch control signal 224 and low-side switch control signal 226 at different times). Additionally, when power converter 200 is operating in a discontinuous current mode, cross-conduction avoidance logic 206 is configured to ensure that low-side switch 210 is disabled when the current flowing through output inductor 254 reaches zero. Accordingly, cross-conduction avoidance logic 206 may de-assert (or assert, in embodiments in which low-side switch 210 is active "low") low-side switch control signal 226 upon detecting that the current flowing though output inductor 254 reaches zero. Note that a control signal may be "asserted" or "de-asserted" by providing a high logic value or a low logic value on the control signal, or configuring the control signal in another manner, as desired for a particular implementation.

High-side switch 208 and low-side switch 210 are configured to controllably provide DC power to load 258 of output stage 212. The enable and disable times of high-side switch 208 and low-side switch 210 are balanced to maintain the desired output voltage. When high-side switch 208 is enabled, output capacitor 252 is charged to the value of input voltage 244 and the current drawn from input voltage 244 flows through output inductor 254. The current flowing through output inductor 254 increases, thereby inducing a positive voltage drop across output inductor 254 that causes a lower output voltage (than compared to input voltage 244) to be provided at load 258. The current flowing through output inductor 254 continues to increase until high-side switch 208 is disabled. When high-side switch 208 is disabled, low-side switch 210 is enabled, and the current flows from ground source 242 through output inductor 254. The current flowing through output inductor 254 decreases, thereby inducing a negative voltage drop across output inductor 254. The current flowing through output inductor 254 continues to decrease until low-side switch 210 is disabled and high-side switch 208 is re-enabled. Load capacitor 256 acts as a low-pass filter that removes voltage ripple from the output voltage.

In accordance with an embodiment, high-side switch 208 is a p-channel depletion metal-oxide semiconductor field-effect transistor (MOSFET) and low-side switch 210 is an n-channel depletion MOSFET (as shown in FIG. 2). It is noted however that other types of switching devices may be used as would be apparent to one of skill in the art having benefit of this disclosure.

When power converter 200 operates in the discontinuous current mode, low-side switch 210 is disabled when the current flowing through output inductor 254 reaches zero. When both high-side switch 208 and low-side switch 210 are disabled, output stage 212 becomes tri-stated. This causes the current flowing through output inductor 254 and the energy stored by output capacitor 252 to resonate. The amount of energy stored by output capacitor 252 at the time high-side switch 208 is subsequently re-enabled may vary due to this resonation. As such, enabling high-side switch 208 at a time when output capacitor 252 has a relatively low amount of energy results in significant capacitance switching loss, higher power dissipation, voltage spikes and/or current spikes, which negatively affect the performance of power converter 200.

Figure 3:
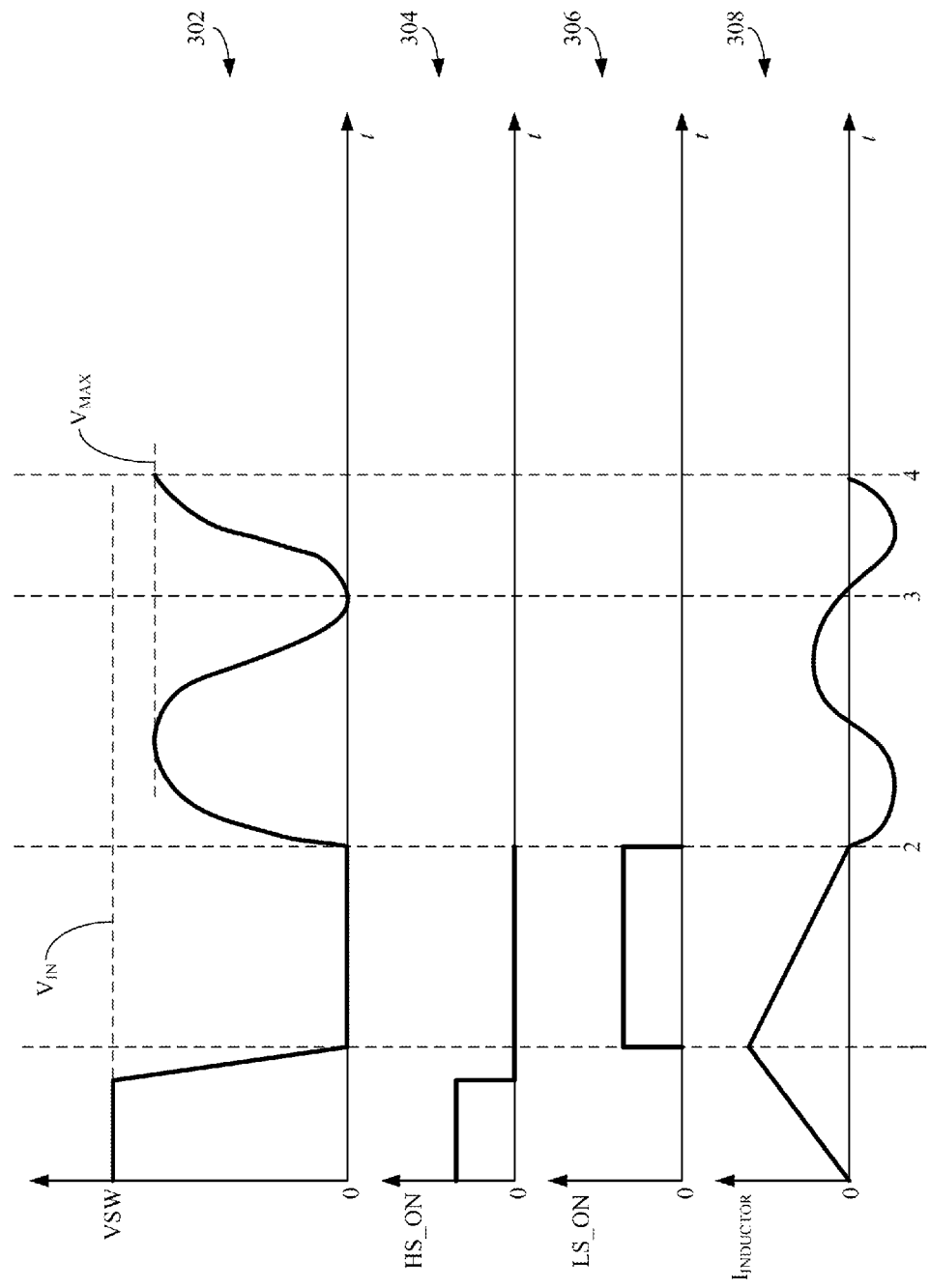
FIG. 3 depicts plots illustrating the behavior of a power converter, according to an example embodiment.

For example, FIG. 3 depicts plots 302, 304, 306, and 308 illustrating the behavior of power converter 200 in a discontinuous current mode, according to an illustrative example. Plot 302 depicts the voltage at switching net ($V_{SW}$) 250 over time t, plot 304 depicts the voltage of high-side switch control signal 224 over time t, plot 306 depicts the voltage of low-side switch control signal 226 over time t, and plot 308 depicts the current flowing through output inductor 254 over time t. As shown in FIG. 3, at time 0, when high-side switch control signal 224 is asserted (thereby causing high-side switch 208 to be enabled), $V_{SW}$ is equal to the input voltage ($V_{IN}$) per plot 302, and per plot 308, the current passing through output conductor 254 increases over time. At time 1, low-side switch control signal 226 is asserted (thereby causing low-side switch 210 to be enabled) after high-side switch control signal 224 is de-asserted), $V_{SW}$ is equal to zero per plot 302, and per plot 308, the current flowing through output inductor 254 begins to decrease. At time 2, when the current flowing through output inductor 254 reaches zero (plot 308), low-side switch control signal 226 is de-asserted, and output stage 212 becomes tri-stated. As shown in plots 302 and 308, this causes $V_{SW}$, the energy stored by output capacitor 252, and the current flowing through output inductor 254 to resonate.

As described above, enabling high-side switch 208 at a time when output capacitor 252 has a relatively low amount of energy disadvantageously results in significant capacitance switching loss, higher power dissipation, voltage spikes and/or current spikes, which negatively affect the performance of power converter 200. For example, if high-side switch 208 is enabled at time 3, where $V_{SW}$ (and energy stored by output capacitor 252) is equal to 0, output capacitor 252 must be charged from zero voltage to $V_{IN}$ for power converter 200 to be fully efficient. However, high-side switch 208 may not be enabled long enough for this to occur, thereby resulting in significant power dissipation and loss in efficiency. In contrast, if high-side switch 208 is enabled at time 4, where $V_{SW}$ is at its maximum voltage ($V_{MAX}$), output capacitor 252 simply needs to be charged from $V_{MAX}$ to $V_{IN}$, thereby resulting in lower power dissipation and higher efficiency than compared to enabling high-side switch 208 at time 3.

Accordingly, power converter 200 of FIG. 2 is configured to adjust the frequency at which high-side switch 208 is enabled such that it is enabled at or near the maximum voltage reached by switching node 250 while power converter 200 operates in the discontinuous current mode. For example, voltage sampling logic 214 may be configured to periodically sample the voltage at switching net 250 at or near the time high-side switch 208 is enabled. For instance, voltage sampling logic 214 may monitor the voltage of high-side switch control signal 224. If the voltage reaches a predetermined threshold, voltage sampling logic 214 determines that high-side switch 208 is to be enabled and samples the voltage at switching net 250. In accordance with an embodiment, the predetermined threshold is the threshold voltage required to enable high-side switch 208. In accordance with another embodiment, the predetermined threshold is some other voltage value. For example, high-side switch control signal 224 may pass through one or more delay stages (not shown). Accordingly, the predetermined threshold may take into account any increase or decrease in voltage of high-side switch control signal 224 that is caused as a result of high-side switch control signal 224 passing through the delay stage(s). The voltage sampled by voltage sampling logic 214 (i.e., sampled voltage 280) is provided to adjustment logic.

Adjustment logic 216 may be configured to periodically compare sampled voltage 280 at switching net 250 for the current cycle to a previously-sampled voltage of switching net 250 (e.g., the voltage at switching net 250 sampled during a previous cycle) to determine whether sampled voltage 280 is greater than the previously-sampled voltage. Adjustment logic 216 is configured to generate a control signal 282 that causes programmable oscillator 202 to adjust (e.g., increase or decrease) the frequency of oscillating signal 218 based, at least in part, on this determination. For example, if adjustment logic 216 determines that sampled voltage 280 is greater than the previously-sampled voltage, adjustment logic 216 sets control signal 282 such that it causes programmable oscillator 202 to adjust the frequency of oscillating signal 218 in the same direction as was performed during a previous cycle (e.g., the last cycle) in which the frequency of oscillating signal 218 was adjusted. For example, if the frequency of oscillating signal 218 was increased during the previous cycle, then the frequency of oscillating signal 218 is increased during the current cycle. If the frequency of oscillating signal 218 was decreased during the previous cycle, then the frequency of oscillating signal 218 is decreased during the current cycle. If adjustment logic 216 determines that sampled voltage 282 is not greater than the previously-sampled voltage, adjustment logic 216 sets control signal 282 such that it causes programmable oscillator 202 to adjust the frequency of oscillating signal 218 in the opposite direction than was performed during the previous cycle. For example, if the frequency of oscillating signal 218 was increased during the previous cycle, then the frequency of oscillating signal 218 is decreased during the current cycle. If the frequency of oscillating signal 218 was decreased during the previous cycle, then the frequency of oscillating signal 218 is increased during the current cycle.

Frequency-adjusted oscillating signal 218 causes modulated width pulse signal 220 to be provided at a different frequency. Thus, high-side switch control signal 224 and low-side switch control signal 226, are also provided at a different frequency. Control signal 282 is provided to programmable oscillator 202.

Programmable oscillator 202 may be configured to periodically perform the frequency adjustment of oscillating signal 218 based on control signal 282 received via such that the voltage of switching net 250 at which high-side switch 208 is enabled becomes closer and closer to the maximum voltage ($V_{MAX}$) of switching net 250.

In accordance with an embodiment, the amount in which the frequency is adjusted may vary based on the difference between the voltage sampled for the current cycle and the previously-sampled voltage and/or how the frequency of oscillating signal 218 was adjusted (e.g., whether it was increased or decreased) during a previous cycle. For example, if the difference is relatively small, then the amount in which the frequency is adjusted may be relatively small. In contrast, if the difference is relatively large, then the amount in which the frequency is adjusted may be relatively large.

It is noted that the periodic sampling of the voltage at switching net 250 performed by voltage sampling logic 214, the periodic comparison of the sampled voltage to the previously-sampled voltage performed by adjustment logic 216, and/or the periodic frequency adjustment performed by programmable oscillator 218 may occur in accordance with any period (e.g., every cycle, every other cycle, every N cycles, where N is any positive integer, etc.).

Figure 4:
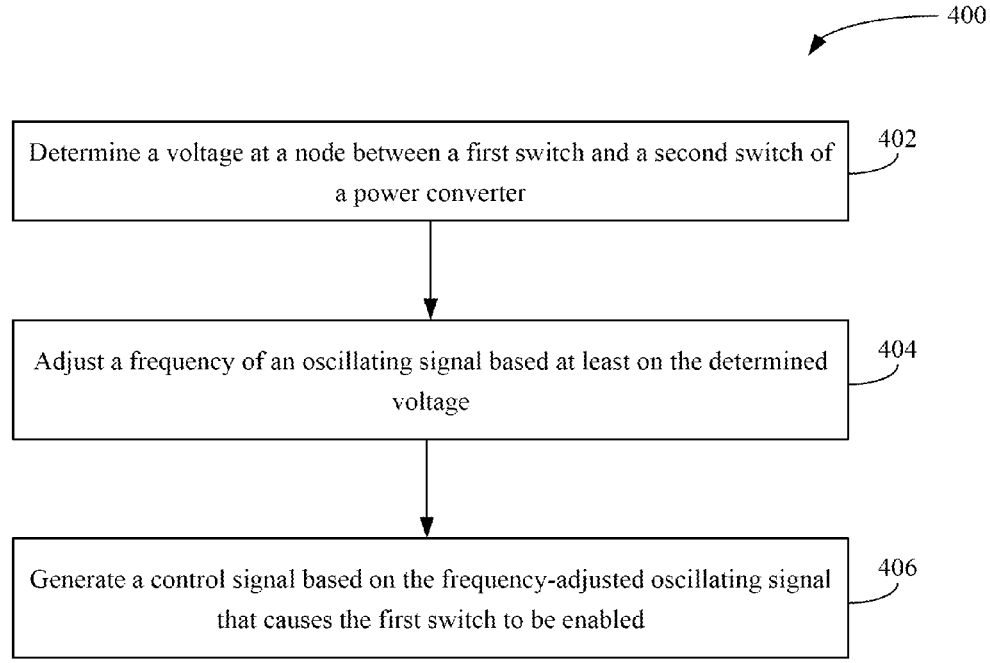
FIG. 4 shows a flowchart of an example method for adjusting the frequency of an oscillating signal so that a high-side switch is enabled at a maximum voltage of a switching net when operating in a discontinuous current mode, according to an example embodiment.

Accordingly, in embodiments, power converter 200 may operate in various ways to adjust the frequency of the oscillating signal so that the high-side switch is enabled at a maximum voltage of switching net 250 when operating in the discontinuous current mode. For example, FIG. 4 depicts a flowchart 400 of an example method for adjusting the frequency of the oscillating signal in accordance with an example embodiment. The method of flowchart 400 will now be described with continued reference to power converter 200, although the method is not limited to that implementation. Other structural and operational embodiments will be apparent to persons skilled in the relevant art(s) based on the discussion regarding flowchart 400 and power converter 200.

As shown in FIG. 4, a voltage at a node between a first switch and a second switch of a power converter is determined (402). For example, with reference to FIG. 2, voltage sampling logic 214 determines a voltage at switching net 250 of power converter 200, which is coupled between high-side switch 208 and low-side switch 210. Additional details regarding how the voltage may be determined is described below with reference to FIG. 5

Continuing with flowchart 400, a frequency of an oscillating signal is adjusted based at least on the sampled voltage (404). For example, with reference to FIG. 2, programmable oscillator 202 adjusts the frequency of oscillating signal 218 based on control signal 282 generated by adjustment logic 216. Adjustment logic 216 generates control signal 282 based on the voltage sampled at switching net 250 by voltage sampling logic 214. The frequency of oscillating signal 218 may also be adjusted based on how the frequency of oscillating signal 218 was adjusted during a previous cycle (e.g., the last cycle) in which the frequency of oscillating signal 218 was adjusted. Additional details are regarding how the frequency of oscillating signal 218 is adjusted based on the sampled voltage may be described below with reference to FIG. 6.

In accordance with one or more embodiments, an amount in which the frequency is adjusted is based on a difference between the determined voltage and a previously-determined voltage of the node (e.g., a voltage of the node determined during a previous cycle) and/or how the frequency of oscillating signal 218 was adjusted (e.g., whether it was increased or decreased) during a previous cycle.

Continuing with flowchart 400, a control signal is generated based on frequency-adjusted oscillating signal 218 that causes the first switch to be enabled (406). For example, with reference to FIG. 2, cross-conduction avoidance logic 206 generates a high-side switch control signal 224 that causes high-side switch 208 to be enabled when it reaches a threshold voltage. High-side switch control signal 224 is generated based on modulated width pulse signal 220 that is generated by duty cycle control logic 204. Modulated width pulse signal 220 is generated in accordance to frequency-adjusted oscillating signal 218 generated by programmable oscillator 202.

In accordance with one or more embodiments, power converter 200 is a buck converter.

In accordance with one or more embodiments, the method of flowchart 400 is performed during a discontinuous current mode of power converter 200.

Figure 5:
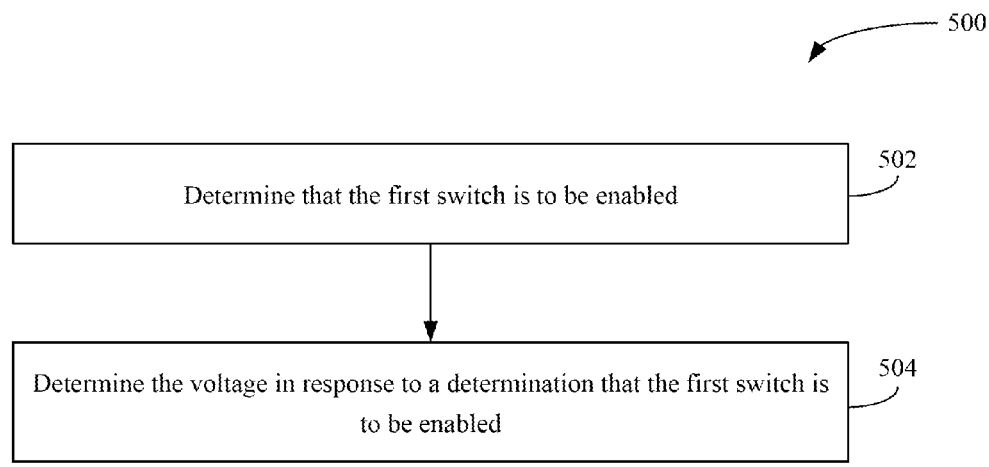
FIG. 5 shows a flowchart of an example method for determining the voltage at a switching net, according to an example embodiment.

In embodiments, power converter 200 may operate in various ways to determine the voltage at switching net 250. For example, FIG. 5 depicts a flowchart 500 of an example method for determining the voltage at switching net 250 in accordance with an example embodiment. The method of flowchart 500 will now be described with continued reference to power converter 200, although the method is not limited to that implementation. Other structural and operational embodiments will be apparent to persons skilled in the relevant art(s) based on the discussion regarding flowchart 500 and power converter 200.

As shown in FIG. 5, a determination is made that the first switch is to be enabled (502). For example, with reference to FIG. 2, voltage sampling logic 214 may monitor the voltage of high-side switch control signal 224. If the voltage reaches a predetermined threshold, voltage sampling logic 214 determines that high-side switch 208 is to be enabled and samples the voltage at switching net 250. In accordance with an embodiment, the predetermined threshold is the threshold voltage required to enable high-side switch 208. In accordance with another embodiment, the predetermined threshold is some other voltage value.

Continuing with FIG. 5, the voltage is determined in response to the determination that the first switch is to be enabled (504). For example, with reference to FIG. 2, voltage sampling logic 214 determines the voltage at switching net 250 in response to the determination that high-side switch 208 is to be enabled.

Figure 6:
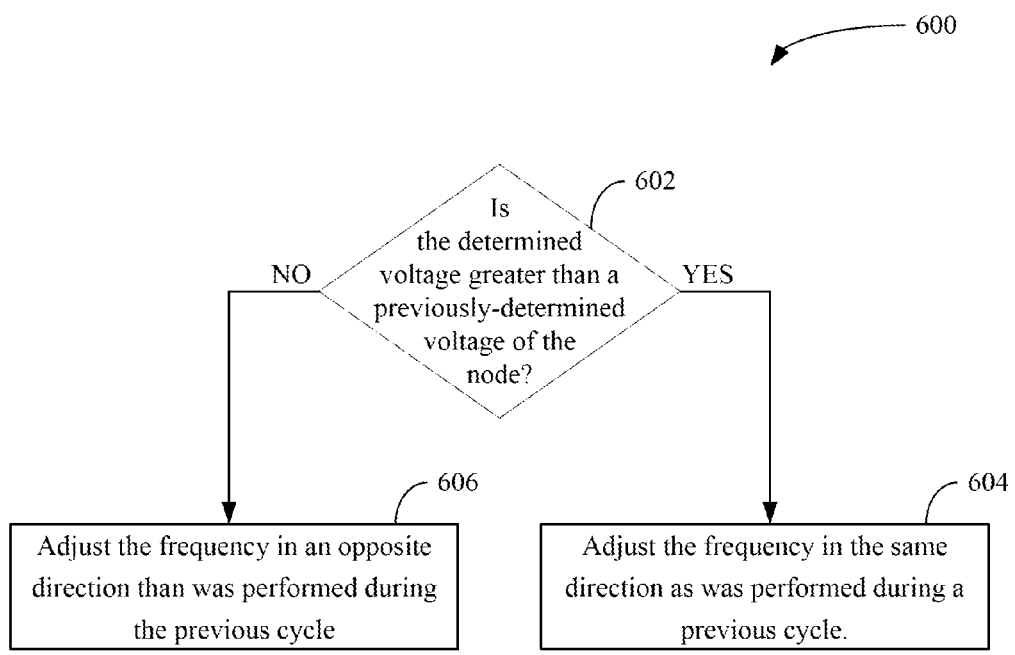
FIG. 6 shows a flowchart of an example method for adjusting the frequency of an oscillating signal based on a sampled voltage of a switching net, according to an example embodiment.

In embodiments, power converter 200 may operate in various ways to adjust the frequency of the oscillating signal based on the sampled voltage of switching net 250. For example, FIG. 6 depicts a flowchart 600 of an example method for adjusting the frequency of the oscillating signal based on the sampled voltage of switching net 250 in accordance with an example embodiment. The method of flowchart 600 will now be described with continued reference to power converter 200, although the method is not limited to that implementation. Other structural and operational embodiments will be apparent to persons skilled in the relevant art(s) based on the discussion regarding flowchart 600 and power converter 200.

As shown in FIG. 6, a determination is made as to whether the determined voltage is greater than a previously-determined voltage of the node (602). For example, with reference to FIG. 2, adjustment logic 216 may determine whether the determined voltage is greater than a previously-determined voltage of switching net 250 (e.g., a voltage of switching net 250 determined during a previous cycle).

Continuing with FIG. 6, the frequency is adjusted in the same direction as was performed during a previous cycle is response to a determination that the determined voltage is greater than the previously-determined voltage of the node (604). For example, with reference to FIG. 2, in response to determining that the determined voltage (i.e., sampled voltage 280) is greater than the previously-determined voltage of switching net 250, adjustment logic 216 generates control signal 282 that causes programmable oscillator 202 to adjust the frequency in the same direction as was performed during a previous cycle. For example, if the frequency of oscillating signal 218 was increased during the previous cycle, then the frequency of oscillating signal 218 is increased during the current cycle. If the frequency of oscillating signal 218 was decreased during the previous cycle, then the frequency of oscillating signal 218 is decreased during the current cycle.

Continuing with FIG. 6, the frequency is adjusted in an opposite direction than was performed during the previous cycle in response to a determination that the determined voltage is not greater than the previously-determined voltage of the node (606). For example, with reference to FIG. 2, in response to determining that the determined voltage (i.e., sampled voltage 280) is not greater than the previously-determined voltage of switching net 250, adjustment logic 216 generates control signal 282 that causes programmable oscillator 202 to adjust the frequency in the opposite direction than was performed during the previous cycle. For example, if the frequency of oscillating signal 218 was increased during the previous cycle, then the frequency of oscillating signal 218 is decreased during the current cycle. If the frequency of oscillating signal 218 was decreased during the previous cycle, then the frequency of oscillating signal 218 is increased during the current cycle.

IV. Conclusion

Embodiments are not limited to the functional blocks, detailed examples, steps, order or the entirety of subject matter presented in the figures, which is why the figures are referred to as exemplary embodiments.

A device, as defined herein, is a machine or manufacture as defined by 35 U.S.C. §101. A device may comprise, for example but not limited to, an amplifier, driver, wireless device, communications device, receiver, transmitter, transceiver, etc. Devices may be digital, analog or a combination thereof. Devices (e.g., power converters, switches, etc.) may be implemented with any semiconductor technology, including one or more of a Bipolar Junction Transistor (BJT), a heterojunction bipolar transistor (HBT), a MOSFET device, a metal semiconductor field effect transistor (MESFET) or other transconductor or transistor technology device. Such alternative devices may require alternative configurations other than the configuration illustrated in embodiments presented herein.

Techniques, including methods, described herein may be implemented in hardware (digital and/or analog) or a combination of hardware, software and/or firmware. Techniques described herein may be implemented in one or more components. Embodiments may comprise computer program products comprising logic (e.g., in the form of program code or software as well as firmware) stored on any computer useable medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable media include, but are not limited to, a hard disk, a removable magnetic disk, a removable optical disk, flash memory cards, digital video disks, random access memories (RAMs), read only memories (ROM), and the like. In greater detail, examples of such computer-readable media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Proper interpretation of subject matter described herein and claimed hereunder is limited to patentable subject matter under 35 U.S.C. §101. Subject matter described in and claimed based on this patent application is not intended to and does not encompass unpatentable subject matter. As described herein and claimed hereunder, a method is a process defined by 35 U.S.C. §101. As described herein and claimed hereunder, each of a circuit, device, apparatus, machine, system, computer, module, media and the like is a machine and/or manufacture defined by 35 U.S.C. §101.

While a limited number of embodiments have been described, those skilled in the art will appreciate numerous modifications and variations there from. Embodiments have been presented by way of example only, and not limitation. It will be apparent to persons skilled in the relevant art(s) that various changes in form and details can be made therein without departing from the spirit and scope of the disclosed technologies. The exemplary appended claims encompass embodiments and features described herein, modifications and variations thereto as well as additional embodiments and features that fall within the true spirit and scope of the disclosed technologies. Thus, the breadth and scope of the disclosed technologies should not be limited by any of the above-described exemplary embodiments, but should be defined only in accordance with the following claims and their equivalents.

What is claimed is:

1. A method, comprising:
   determining a voltage at a node between a first switch and a second switch of a power converter;
   adjusting a frequency of an oscillating signal based at least on the determined voltage, said adjusting comprising:
      determining whether the determined voltage is greater than a previously-determined voltage of the node;
      adjusting the frequency in the same direction as was performed during a previous cycle in response to determining that the determined voltage is greater than the previously-determined voltage of the node; and
      adjusting the frequency in an opposite direction than was performed during the previous cycle in response to determining that the determined voltage is not greater than the previously-determined voltage of the node; and
   generating a control signal based on the frequency-adjusted oscillating signal that causes the first switch to be enabled.

2. The method of claim 1, wherein said determining the voltage at the node comprises:
   determining that the first switch is to be enabled; and
   determining the voltage in response to determining that the first switch is to be enabled.

3. The method of claim 1, wherein an amount in which the frequency is adjusted is based on a difference between the determined voltage and the previously-determined voltage of the node.

4. The method of claim 1, wherein the power converter is a buck converter.

5. The method of claim 1, wherein said determining, said adjusting, and said generating are performed during a discontinuous current mode of the power converter.

6. The method of claim 2, wherein determining that the first switch is to be enabled comprises:
   monitoring a voltage of a third control signal configured to enable the first switch;
   determining that the monitored voltage reaches a predetermined threshold; and
   determining that the first switch is to be enabled in response to a determination that the monitored voltage reaches the predetermined threshold.

7. The method of claim 1, wherein the control signal causes the first switch to be enabled when the control signal reaches a threshold voltage of the first switch.

8. A power converter, comprising:
   a high-side switch;
   a low-side switch;
   a node coupled to the high-side switch and the low-side switch;
   voltage sampling logic coupled to the node, the voltage sampling logic configured to sample a voltage at the node; and
   adjustment logic configured to generate a first control signal that adjusts a frequency of an oscillating signal based at least on the sampled voltage, the frequency-adjusted oscillating signal being used to generate a second control signal that causes the high-side switch to be enabled, wherein the adjustment logic comprises:

first logic configured to determine whether the sampled voltage is greater than a previously-sampled voltage of the node;

second logic configured to set the first control signal in a manner that causes the frequency of the oscillating signal to be adjusted in the same direction as was performed during a previous cycle in response to a determination that the sampled voltage is greater than the previously-sampled voltage of the node; and third logic configured to set the first control signal in a manner that causes the frequency of the oscillating signal to be adjusted in an opposite direction than was performed during the previous cycle in response to a determination that the sampled voltage is not greater than the previously-sampled voltage of the node.

9. The power converter of claim 8, further comprising:
a programmable oscillator configured to receive the first control signal and adjust the frequency of the oscillating signal based on the first control signal.

10. The power converter of claim 8, wherein the voltage sampling logic comprises:
fourth logic configured to determine that the high-side switch is to be enabled; and
fifth logic configured to sample the voltage in response to a determination that the high-side switch is to be enabled.

11. The power converter of claim 10, wherein the fourth logic comprises:
sixth logic configured to monitor a voltage of a third control signal configured to enable the high-side switch;
seventh logic configured to determine that the monitored voltage reaches a predetermined threshold; and
eighth logic configured to determine that the high-side switch is to be enabled in response to a determination that the monitored voltage reaches the predetermined threshold.

12. The power converter of claim 8, wherein an amount in which the frequency is adjusted is based on a difference between the sampled voltage and the previously-sampled voltage of the node.

13. The power converter of claim 8, wherein the power converter is a buck converter.

14. The power converter of claim 8, wherein the voltage sampling logic is configured to sample the voltage at the node and wherein the adjustment logic is configured to generate the second control signal during a discontinuous current mode of the power converter.

15. A power converter, comprising:
a high-side transistor comprising a first gate terminal, a first source terminal, and a first drain terminal;
a low-side transistor comprising a second gate terminal, a second source terminal, and a second drain terminal;
a node coupled to the first drain terminal and the second drain terminal;
voltage sampling logic coupled to the node, the voltage sampling logic configured to sample a voltage at the node; and
adjustment logic configured to generate a first control signal that causes a frequency at which a second control signal is provided to the first gate terminal to be adjusted based at least on the sampled voltage, the second control signal causing the high-side transistor to be enabled when the second control signal reaches a threshold voltage, wherein the adjustment logic comprises:

first logic configured to determine whether the sampled voltage is greater than a previously-sampled voltage of the node;

second logic configured to set the first control signal in a manner that causes the frequency at which the second control signal is provided to be adjusted in the same direction as was performed during a previous cycle in response to a determination that the sampled voltage is greater than the previously-sampled voltage of the node; and third logic configured to set the first control signal in a manner that causes the frequency at which the second control signal is provided to be adjusted in an opposite direction than was performed during the previous cycle in response to a determination that the sampled voltage is not greater than the previously-sampled voltage of the node.

16. The power converter of claim 15, wherein the voltage sampling logic comprises:
fourth logic configured to determine that the high-side transistor is to be enabled; and
fifth logic configured to sample the voltage in response to a determination that the high-side switch is to be enabled.

17. The power converter of claim 16, wherein the fourth logic comprises:
sixth logic configured to monitor a voltage of the second control signal;
seventh logic configured to determine that the monitored voltage reaches a predetermined threshold; and
eighth logic configured to determine that the high-side transistor is to be enabled in response to a determination that the monitored voltage reaches the predetermined threshold.

18. The power converter of claim 17, wherein the predetermined threshold is the threshold voltage.

19. The power converter of claim 15, wherein the power converter is a buck converter.

20. The power converter of claim 15, wherein the voltage sampling logic is configured to sample the voltage at the node and wherein the adjustment logic is configured to generate the first control signal during a discontinuous current mode of the power converter.

21. A power converter, comprising:
a high-side switch;
a low-side switch;
a node coupled to the high-side switch and the low-side switch;
voltage sampling logic coupled to the node, the voltage sampling logic configured to sample a voltage at the node, wherein the voltage sampling logic comprises:
first logic configured to determine that the high-side switch is to be enabled; and
second logic configured to sample the voltage in response to a determination that the high-side switch is to be enabled, wherein the first logic comprises:
third logic configured to monitor a voltage of a third control signal configured to enable the high-side switch;
fourth logic configured to determine that the monitored voltage reaches a predetermined threshold; and
fifth logic configured to determine that the high-side switch is to be enabled in response to a determination that the monitored voltage reaches the predetermined threshold; and adjustment logic configured to generate a first control signal that adjusts a frequency of an oscillating signal based at least on the sampled voltage, the frequency-adjusted oscillating signal being used to generate a second control signal that causes the high-side switch to be enabled.

22. A power converter, comprising:

a high-side transistor comprising a first gate terminal, a first source terminal, and a first drain terminal;

a low-side transistor comprising a second gate terminal, a second source terminal, and a second drain terminal;

a node coupled to the first drain terminal and the second drain terminal;

voltage sampling logic coupled to the node, the voltage sampling logic configured to sample a voltage at the node, wherein the voltage sampling logic comprises:

first logic configured to determine that the high-side transistor is to be enabled; and second logic configured to sample the voltage in response to a determination that the high-side switch is to be enabled, wherein the first logic comprises:

third logic configured to monitor a voltage of the second control signal;

fourth logic configured to determine that the monitored voltage reaches a predetermined threshold; and fifth logic configured to determine that the high-side transistor is to be enabled in response to a determination that the monitored voltage reaches the predetermined threshold; and adjustment logic configured to generate a first control signal that causes a frequency at which a second control signal is provided to the first gate terminal to be adjusted based at least on the sampled voltage, the second control signal causing the high-side transistor to be enabled when the second control signal reaches a threshold voltage.

* * * * *